W. H. PITTS.
SAFETY ATTACHMENT FOR AIR HOSE NOZZLES.
APPLICATION FILED JULY 13, 1918.
1,322,338.
Patented Nov. 18, 1919.
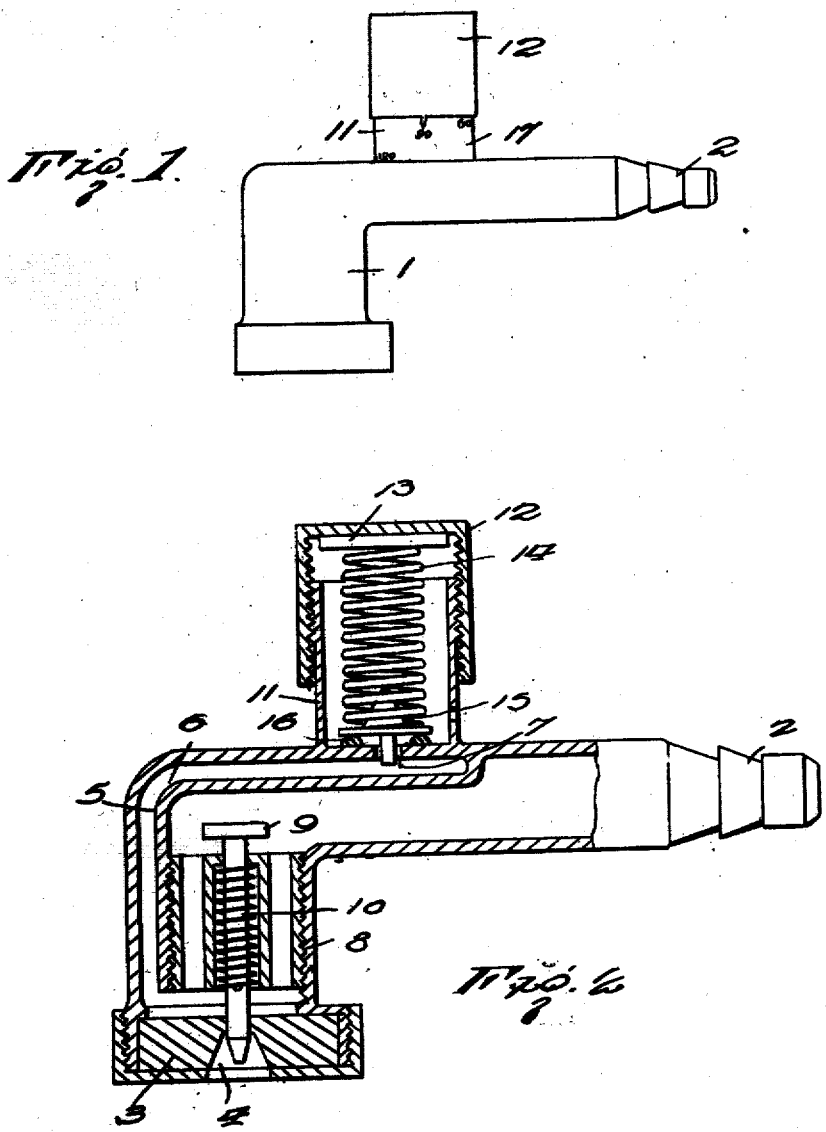
William H. Pitts
Inventor
By Geo. P. Kimmel
Attorney

UNITED STATES PATENT OFFICE.

WILLIAM H. PITTS, OF MEDICINE LODGE, KANSAS.

SAFETY ATTACHMENT FOR AIR-HOSE NOZZLES.

1,322,338.　　　　Specification of Letters Patent.　　Patented Nov. 18, 1919.

Application filed July 13, 1918. Serial No. 244,750.

*To all whom it may concern:*

Be it known that I, WILLIAM H. PITTS, a citizen of the United States, residing at Medicine Lodge, in the county of Barber and State of Kansas, have invented certain new and useful Improvements in Safety Attachments for Air-Hose Nozzles, of which the following is a specification.

This invention relates to improvements in safety attachments for the hose of air compressing pumps, and it is the principal object of the invention to provide a novel form of safety gage for use in connection with the discharge nozzles of those types of air compressing pumps commonly used for inflating tires and the like whereby when a predetermined air pressure is reached in the tire connected to the same, the attachment will be operated to allow the escape of all excessive air pressure therefrom, thus preventing overinflation of the tire and as a consequence lessening liability of "blowouts" and kindred tire troubles.

Another and equally important object of the invention is to provide an attachment of the character mentioned which can be set to permit escape of air at any desired pressure, thus rendering the same applicable for use in connection with tires varying in size.

The improvements in the details and arrangement of parts will be apparent from an inspection of the accompanying drawings, when considered in connection with the specific description hereinafter contained and wherein a preferred embodiment of the invention is disclosed for the purpose of imparting a full understanding thereof.

In the drawings:

Figure 1 is a side elevation of the improved nozzle attachment, and

Fig. 2 is an enlarged vertical longitudinal section therethrough.

Referring now more specifically to the drawings, in connection with which like reference characters will designate corresponding parts throughout the several views, 1 represents the nozzle in its entirety, the same being formed with a corrugated nipple 2 adapted to receive one end of an air hose connected to a suitable form of air compressing pump, while the other end is enlarged and screw threaded to receive a cap having a plug 3 therein formed with a concentrically disposed air passage 4 for an obvious purpose. A partition 5 is formed in the nozzle 1 and extends throughout a portion of its length, thus affording a by-pass 6, one end of which communicates with the discharge end of the nozzle 1 while the other end communicates with an air escape opening 7 formed in the upper side of the intermediate portion of said nozzle. In this connection, it is to be noted that the inner portions of the nozzle 1 formed by the partition 5 is screw threaded and receives a complementally threaded sleeve 8 carrying a pin 9, which pin is engaged by a coil spring 10 in said sleeve and adapted to pass at its lower end through the opening 4 in the plug 3 in position to be engaged by the stem of the usual form of tire valve stem to permit the passage of air from the pressure pump into the tire; the spring 10, obviously, serving to automatically close the flow of air.

A gage member is provided and includes a partially externally screw threaded sleeve 11 arranged on or formed integral with the upper portion of the nozzle 1 and over the air escape opening 7 and receives an internally threaded cap 12, said cap having a bearing member or washer 13 arranged therein and engaged by one end of an expansible coil spring 14, the other end of said spring engaging a valve element 15 adapted to be normally seated over the air escape opening 7, which opening, as will be noted has an annular seat 16 arranged thereabout. The sleeve 11 is provided with an air escape aperture 18. Graduations 17 may be and preferably are arranged on the outer surface of the sleeve 11 and, as will be understood, to enable a user of the device to properly adjust the gage to cause the opening of the valve 15 at a predetermined point.

In using the improved device, the same is of course, attached to the discharge end of an air hose having connection with a suitable form of air compressing pump. The plug 3 is then engaged over the tire valve, the pin 9 serving to unseat said valve and to permit the passage of air thereinto from the pump hose. Should the cap 12 be adjusted on the sleeve 11 to the point indicating seventy pounds pressure, it will be understood that the valve 15 will be permitted to move from its seat when seventy pounds pressure has been obtained in the tire, thus allowing all excessive pressure to escape from the nozzle by way of the opening 7 and thereby preventing overinflation of the tire. In this way, it will be readily appreciated by persons skilled in the art that I provide means for materially lessening liability of "blowouts" and similar tire troubles caused by excessive air pressure in the same.

Manifestly, the construction shown is capable of considerable modification and such modification as is within the scope of my claim. I consider within the spirit of my invention.

I claim:

A nozzle device including a body provided with an air escape chamber having an inlet communicating with the body and adapted to be attached to a hose at one end and having an inlet including a yieldable valve seat at the other end, a sleeve within the body and spaced from the valve seat, a by-pass communicating at one end with the space between the valve and sleeve, and at the other end with the inlet to the escape chamber, a valve yieldably supported within the escape chamber and operating to yieldably close the inlet thereto, and a spring pressed valve coacting with the valve seat and including a stem extending therethrough.

In testimony whereof, I affix my signature hereto.

WILLIAM H. PITTS.